(12) United States Patent
Wei et al.

(10) Patent No.: US 11,258,564 B2
(45) Date of Patent: Feb. 22, 2022

(54) SIGNALING FOR INTERLACED FDM UPLINK DMRS

(71) Applicants: Chao Wei, Beijing (CN); Wanshi Chen, San Diego, CA (US); Peter Gaal, San Diego, CA (US); QUALCOMM Incorporated, San Diego, CA (US)

(72) Inventors: Chao Wei, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/313,806

(22) PCT Filed: May 11, 2017

(86) PCT No.: PCT/CN2017/083955
§ 371 (c)(1),
(2) Date: Dec. 27, 2018

(87) PCT Pub. No.: WO2018/028257
PCT Pub. Date: Feb. 15, 2018

(65) Prior Publication Data
US 2020/0007293 A1      Jan. 2, 2020

(30) Foreign Application Priority Data

Aug. 12, 2016   (WO) ................ PCT/CN2016/094813

(51) Int. Cl.
*H04L 5/00* (2006.01)
(52) U.S. Cl.
CPC .......... *H04L 5/0051* (2013.01); *H04L 5/0007* (2013.01)
(58) Field of Classification Search
CPC ... H04L 5/0051; H04L 5/0007; H04L 1/0029; H04W 52/18; H04W 52/30; H04W 52/42; H04W 72/042
See application file for complete search history.

(56) References Cited

U.S. PATENT DOCUMENTS

| | | |
|---|---|---|
| 2011/0128909 A1 | 6/2011 | Luo et al. |
| 2012/0106373 A1 | 5/2012 | Gaal et al. |

(Continued)

FOREIGN PATENT DOCUMENTS

| | | |
|---|---|---|
| CN | 101911580 A | 12/2010 |
| CN | 103220791 A | 7/2013 |

(Continued)

OTHER PUBLICATIONS

"3GPP TSG RAN WG1 Meeting #68 meeting, "DMRS enhancements for UL CoMP," Sharp, Dresden, Germany, Feb. 6-10, 2012, R1-120828, 11 Pages.".

(Continued)

*Primary Examiner* — Eric Myers
(74) *Attorney, Agent, or Firm* — Norton Rose Fulbright LLP

(57) ABSTRACT

Signaling design for interlaced frequency divisional multiplex (IFDM) demodulation reference signals (DMRS) is discussed in which a dynamic indication is provided to a user equipment (UE) from a serving base station that allows the UE to configure transmission of DMRS according to either a single carrier frequency divisional multiplex (SC-FDM) or IFDM configurations, as indicated by the dynamic indication. The IFDM configuration may be applicable to either regular uplink subframes or within the uplink portion of special subframes. In some aspects, power boosting may be provided for the DMRS in order to equalize transmit power between decimated DMRS transmitted with the data tones. Additional aspects may also provide for different offsets to be used depending on the type of uplink control signal transmitted.

27 Claims, 9 Drawing Sheets

(56) References Cited

U.S. PATENT DOCUMENTS

| | | | |
|---|---|---|---|
| 2012/0113831 A1 | 5/2012 | Pelletier et al. | |
| 2013/0077569 A1 | 3/2013 | Nam et al. | |
| 2014/0036850 A1 | 2/2014 | Akimoto et al. | |
| 2015/0312009 A1 | 10/2015 | Nissila et al. | |
| 2015/0327244 A1* | 11/2015 | Pajukoski | H04L 5/0005 370/330 |
| 2016/0192385 A1 | 6/2016 | Tooher et al. | |
| 2017/0318575 A1* | 11/2017 | Park | H04W 72/0413 |
| 2019/0306808 A1* | 10/2019 | Gao | H04W 52/16 |

FOREIGN PATENT DOCUMENTS

| | | |
|---|---|---|
| CN | 104396173 A | 3/2015 |
| EP | 2056515 A1 | 5/2009 |
| JP | 2013021416 A | 1/2013 |
| JP | 2016517653 A | 6/2016 |
| JP | 2016519485 A | 6/2016 |
| WO | WO-2011053836 A2 | 5/2011 |

OTHER PUBLICATIONS

International Search Report and Written Opinion—PCT/CN2016/094813—ISA/EPO—dated Apr. 28, 2017.
"International Search Report and Written Opinion—PCT/CN2017/083955—ISA/EPO—dated Jul. 26, 2017".
3GPP TSG RAN WG1 #60 meeting,"Uplink DM-RS design," Mitsubishi Electric, Feb. 22-26, 2010, R1-101458, 8 Pages.
Supplementary European Search Report—EP17838389—Search Authority—The Hague—dated Jun. 25, 2019.
Nokia, et al., "Control Signalling for UL DMRS with IFDMA", 3GPP Draft, 3GPP TSG-RAN WG1#86, R1-166341, 3GPP, Aug. 12, 2016, pp. 1-6.

* cited by examiner

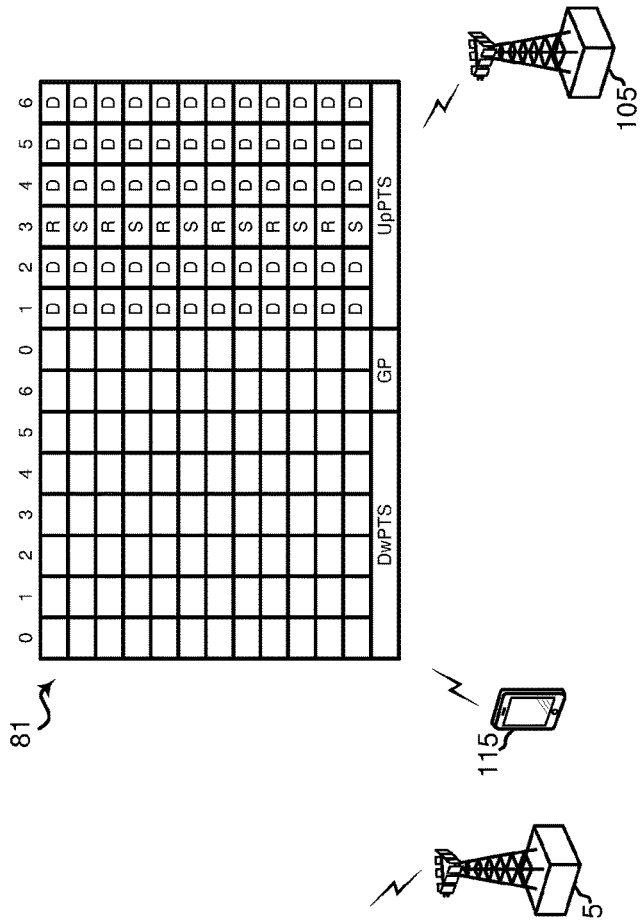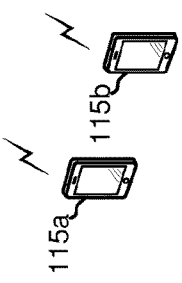
FIG. 8A
FIG. 8B
FIG. 8C

SIGNALING FOR INTERLACED FDM UPLINK DMRS

CROSS-REFERENCE TO RELATED APPLICATIONS

This application claims the benefit of PCT/CN2016/094813, entitled, "SIGNALING FOR INTERLACED FDM UPLINK DMRS," filed on Aug. 12, 2016, which is expressly incorporated by reference herein in its entirety.

BACKGROUND

Field

Aspects of the present disclosure relate generally to wireless communication systems, and more particularly, to signaling for interlaced frequency division multiplex (IFDM) uplink demodulation reference signals (DMRS).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes receiving, at a UE, an indication from a serving base station, configuring transmission of uplink demodulation reference signals (DMRS) according to a transmission configuration identified by the indication, wherein the indication identifies one of: a single carrier frequency divisional multiplex (SC-FDM) or interlaced frequency divisional multiplex (IFDM) configurations, and transmitting the DMRS according to the transmission configuration.

In an additional aspect of the disclosure, an apparatus configured for wireless communication includes means for receiving, at a UE, an indication from a serving base station, means for configuring transmission of uplink DMRS according to a transmission configuration identified by the indication, wherein the indication identifies one of: a SC-FDM or IFDM configurations, and means for transmitting the DMRS according to the transmission configuration.

In an additional aspect of the disclosure, a non-transitory computer-readable medium having program code recorded thereon. When executed by a computer, the program code causes the computer to control or execute functionality. The program code further includes code to receive, at a UE, an indication from a serving base station, code to configure transmission of uplink DMRS according to a transmission configuration identified by the indication, wherein the indication identifies one of: a SC-FDM or IFDM configurations, and code to transmit the DMRS according to the transmission configuration.

In an additional aspect of the disclosure, an apparatus configured for wireless communication is disclosed. The apparatus includes at least one processor, and a memory coupled to the processor. The processor is configured to receive, at a UE, an indication from a serving base station, to configure transmission of uplink DMRS according to a transmission configuration identified by the indication, wherein the indication identifies one of: a SC-FDM or IFDM configurations, and to transmit the DMRS according to the transmission configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A-8C are block diagrams illustrating a special subframe communicated between a UE and a base station configured according to one aspect of the present disclosure.

DETAILED DESCRIPTION

Figure 1:
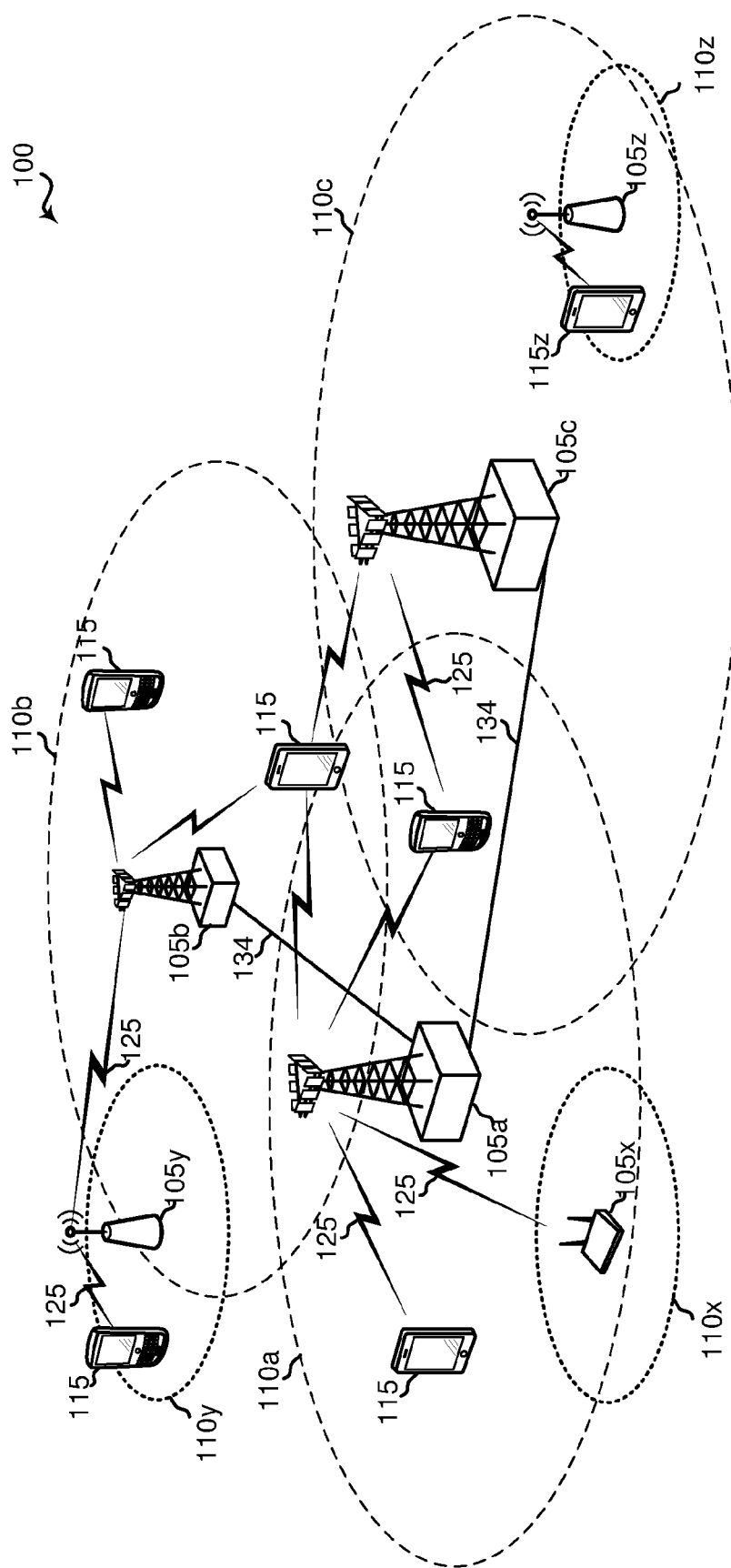
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
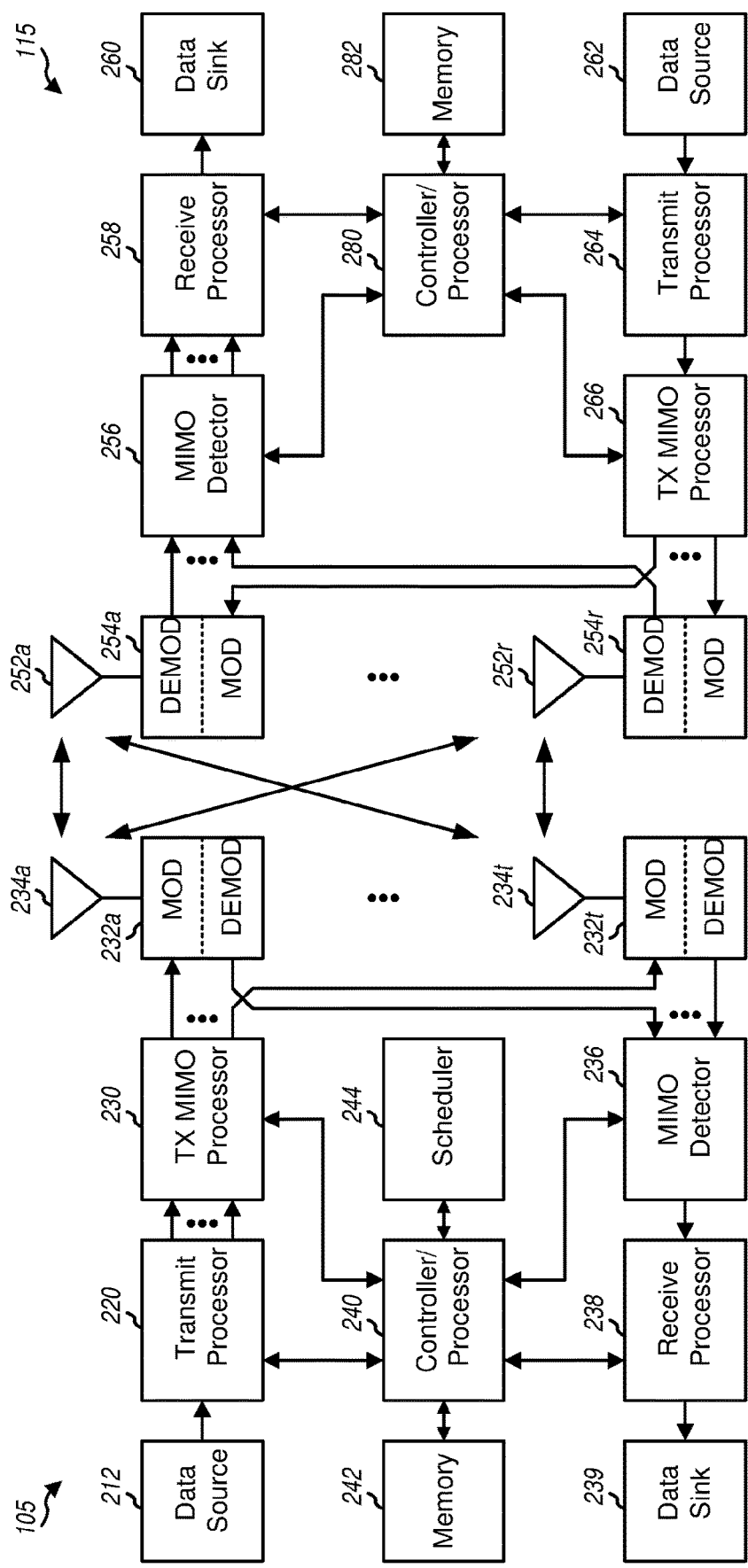
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIG. 6, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology is a communication technology that has been added to the LTE specifications in order to improve the performance of the system. This technology provides LTE with the ability to further improve its data throughput and spectral efficiency above that obtained by the use of OFDM. The basic concept of MIMO uses the multipath signal propagation that is present in terrestrial communications. Rather than providing interference, these paths can be used to advantage. The transmitter and receiver typically have more than one antenna and, using the processing power available at either end of the link, are able to use the different paths between the two entities to provide improvements in the data rate of signal to noise.

MIMO communication systems may be provisioned as single-user MIMO (SU-MIMO) or multi-user MIMO (MU-MIMO). In SU-MIMO systems, the eNB communicates with only one UE at any given time. In contrast, the eNB in a MU-MIMO system is able to communicate with multiple UEs at once. SU-MIMO and MU-MIMO systems are two possible configurations for multi-user communication systems. These systems may be able to achieve the overall multiplexing gain obtained as the minimum value between the number of antennas at base stations and the number of antennas at users. The fact that multiple users may simultaneously communicate over the same spectrum improves the system performance. Nevertheless, MU-MIMO networks are exposed to strong co-channel interference which is not the case for SU-MIMO networks. MU-MIMO systems address such interference using various interference management techniques including techniques based on beamforming. The beamforming of MU-MIMO systems benefits from channel state information (CSI) feedback of the serviced UEs.

An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

MU-MIMO systems may be implemented with eNBs configured with lower-order antennas arrays (e.g., $N_T \leq 8$) or with higher-order or "massive" antennas arrays (e.g., $N_T \geq 8$), where $N_T$ represents the number of transmit antennas of the eNB. In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
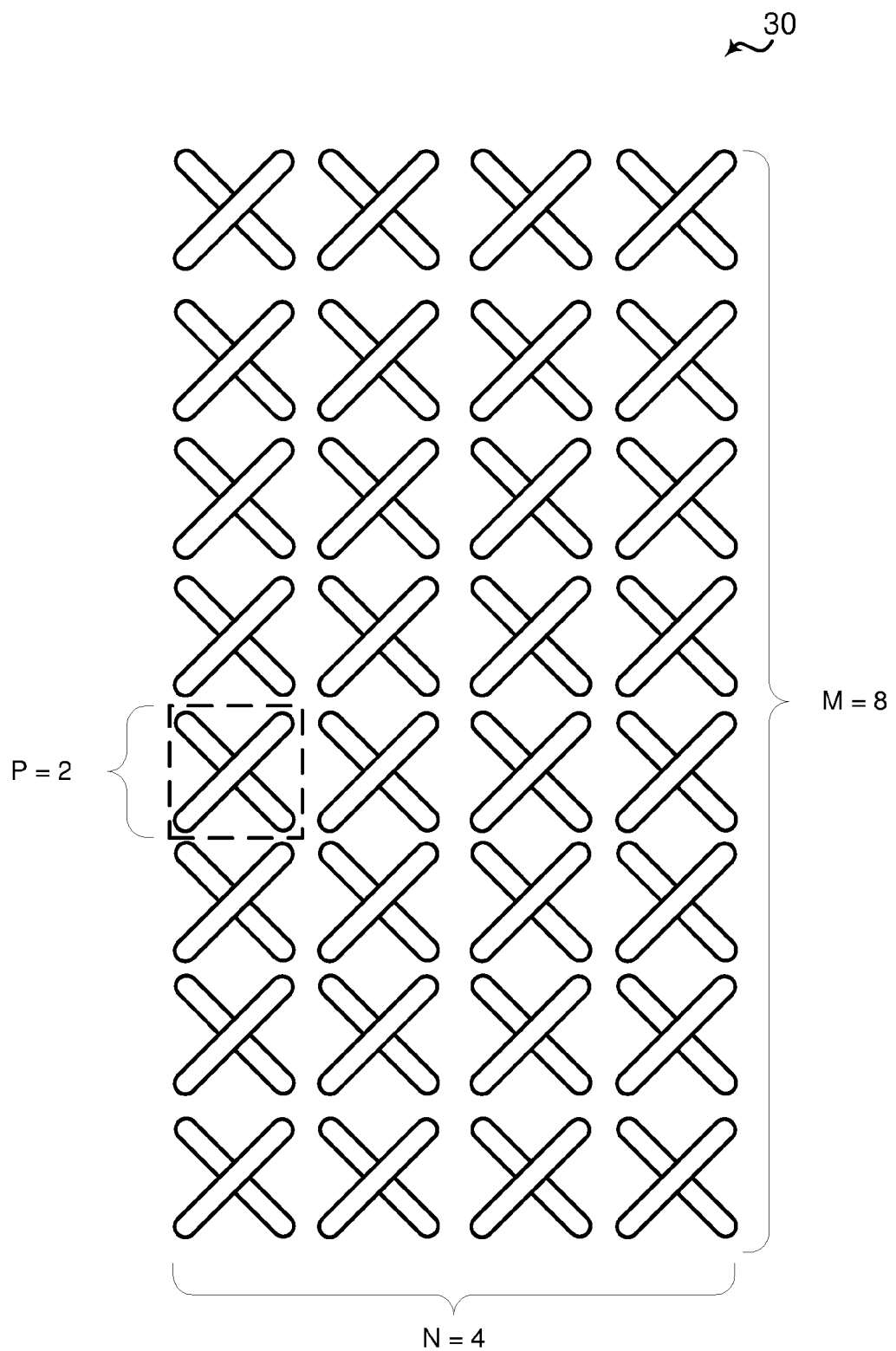
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2). For a 2D array structure, in order to exploit the vertical dimension by elevation beamforming the CSI is used at the base station. The CSI, in terms of PMI, RI, and CQI, can be fed back to the base station by a mobile station based on downlink channel estimation and predefined PMI codebook(s).

In current LTE systems, uplink demodulation reference signals (DMRS) are generally time multiplexed with the PUSCH data symbols occupying the same bandwidth. Uplink DMRS may be transmitted on one SC-FDMA symbol per slot, thus, two DMRS symbols may be transmitted per subframe.

Figure 4:
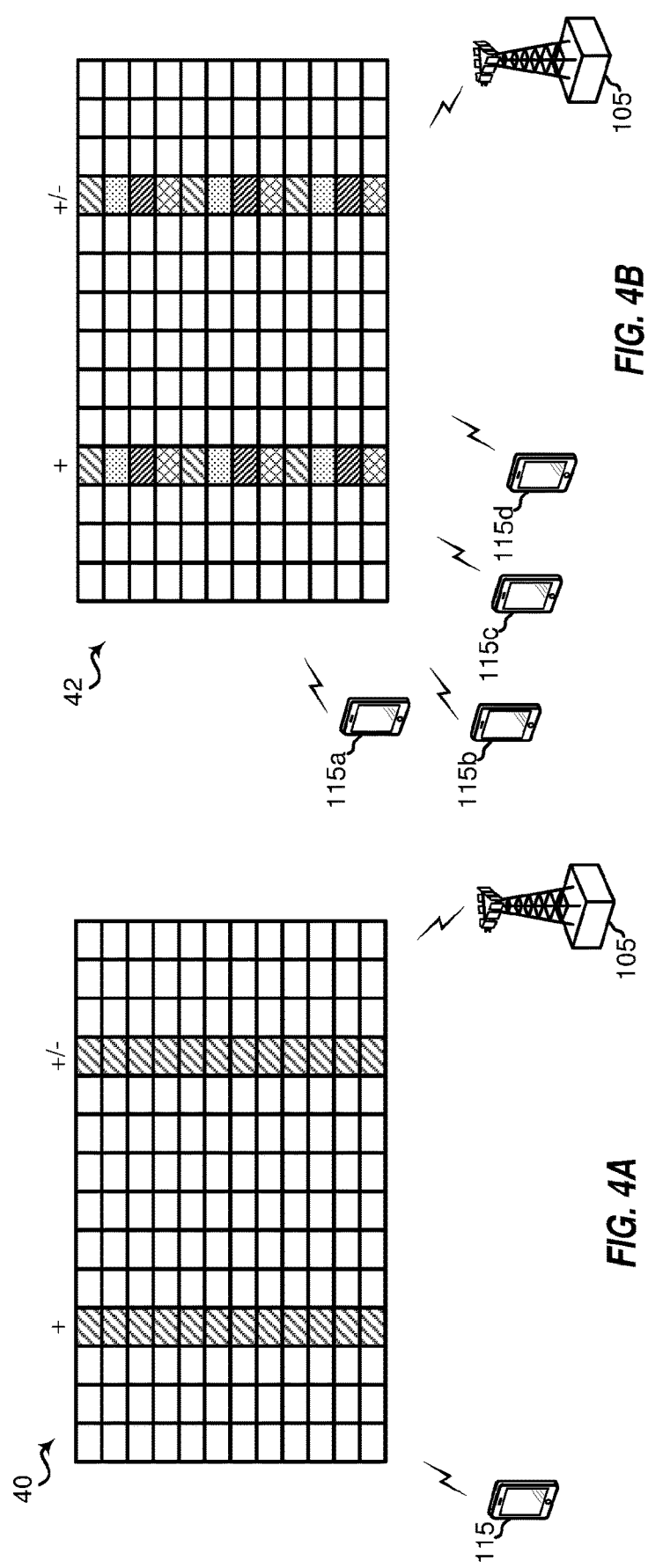
FIGS. 4A-4B are block diagrams illustrating a subframe communicated between a UE and a base station.

FIG. 4A is a block diagram illustrating a subframe 40 communicated between UE 115 and base station 105. The two shaded SC-FDMA symbols within subframe 40 represent the DMRS symbols transmitted by UE 115. UEs 115a and 115b transmitting on the same set of subcarriers may use different cyclic shifts of the same base sequence to provide orthogonal DMRS multiplexing.

FIG. 4B is a block diagram illustrating a subframe communicated between UEs 115a-115d and a base station 105. With the deployment of higher order antenna arrays at eNBs, such as massive MIMO at base station 105, an increase of DMRS port orthogonality for higher order MU-MIMO in uplink may be beneficial (e.g., supporting more than two UEs with partially overlapping bandwidth allocation). Interleaved frequency division multiplex (IFDM) or comb-based DMRS has been proposed in future wireless standards, such as Rel-14. A combined cyclic shift (CS) and time domain orthogonal cover code (OCC) are used to separate the DMRS for different UEs, such as UEs 115a and 115b, participating in the multi-user MIMO (MU-MIMO) operation. For example, different users' DMRS transmission using a different comb value or occupying interleaved sets of subcarriers may remain orthogonal.

With a comb value number of 2 and 4, up to 4 and 8 UEs, respectively, with partially overlapping bandwidth allocation can be supported by combining with a time domain OCC. For example, as illustrated in FIG. 4B UEs 115a-115d may be accommodated using a comb number of 4. The DMRS of UEs 115a-115b and UEs 115c-115d are represented by the different shading in the two SC-FDM symbols of subframe 42 holding DMRS transmissions. The multiplexed DMRS of UEs 115a-115b may be assigned with different OCC for time domain spreading to maintain port orthogonality (e.g., OCC=[1 1] for UE 115a and OCC=[1 −1] for UE 115b for spreading two DMRS symbols in subframe. However, one issue that may arise with IFDM DMRS is its application to small RB allocation, since the length of a DMRS sequence is generally divided by the comb number and the sequence orthogonality cannot typically be maintained for a reduced DMRS sequence. Another issue that may arise is that a new DMRS sequence design may be useful for IFDM DMRS, since the DMRS sequence length can be 9, 15, 18, 24, 27, 30 for some configurations of comb number and RB assignment, which are not currently supported.

Figure 5:
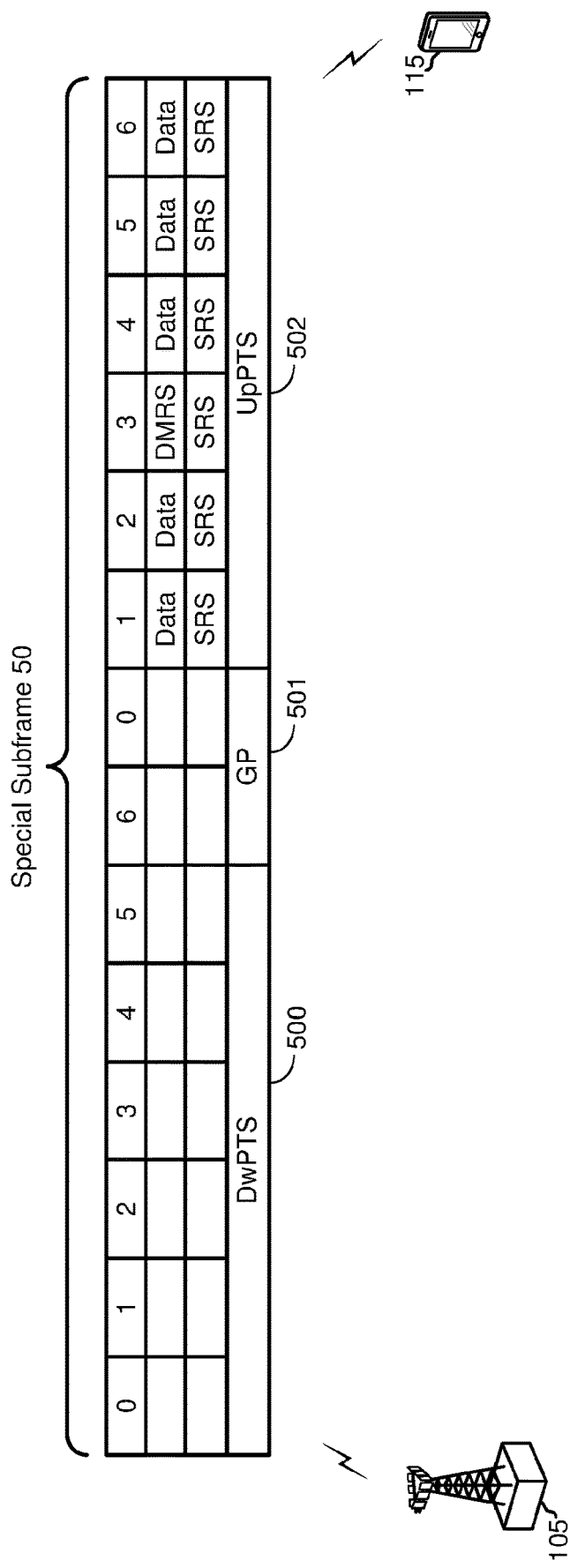
FIG. 5 is a block diagram illustrating a special subframe communicated between a base station and a UE.

FIG. 5 is a block diagram illustrating a special subframe 50 communicated between a base station 105 and UE 115. Special subframe 50 includes downlink pilot time slot (DwPTS) 500 of six symbols, a guard period (GP) 501 of two symbols, and an uplink pilot time slot (UpPTS) 502 of six symbols. Future wireless standards, such as Rel-14, support PUSCH transmissions in UpPTS 502 of special subframe 50 with either 4 or 6 OFDM symbols, as illustrated in FIG. 5. Previous standard versions included support for SRS and short PRACH transmissions in UpPTS 502 of special subframe 50. Reusing the same DMRS mapping for PUSCH in special subframe means that only one DMRS symbol at symbol 3 of UpPTS 502 may be available, which may not easily support MU-MIMO. Additionally, there may be a potential collision with SRS transmissions in one or more of the symbols as illustrated also at symbol 3 of UpPTS 502. If the DMRS is dropped because of such collisions, then there would be no reference signal available for PUSCH demodulation. Various aspects of the present disclosure are directed to providing a dynamic indication of either SC-FDM or IFDM DMRS configuration.

Figure 6:
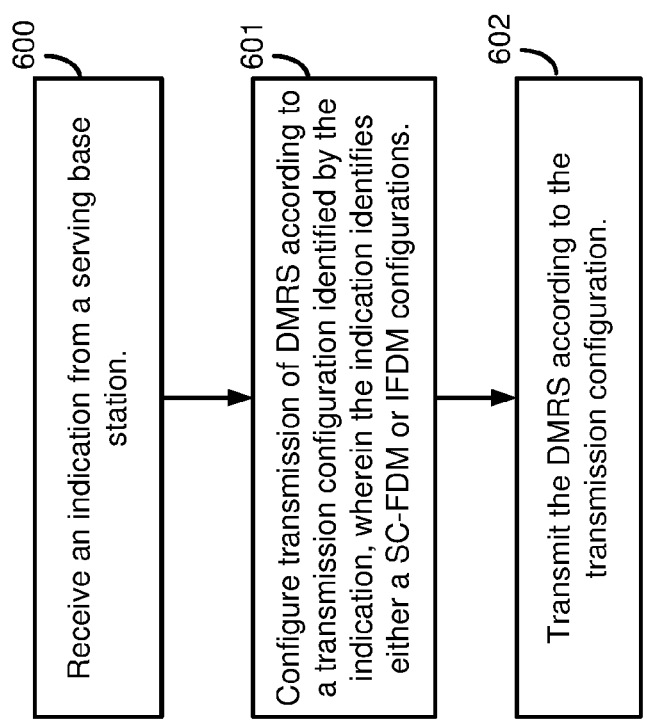
FIG. 6 is a block diagram illustrating example blocks executed to implement one aspect of the present disclosure.
Figure 9:
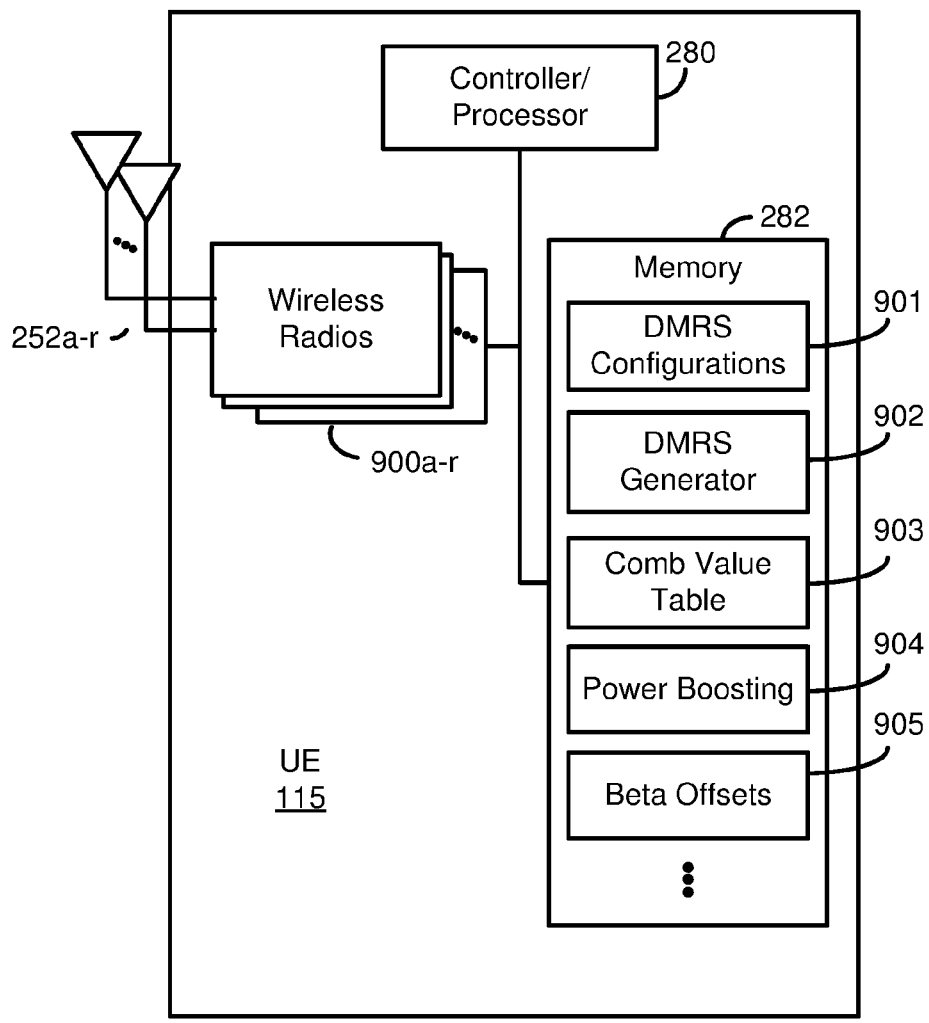
FIG. 9 is a block diagram illustrating an example UE configured according to one aspect of the present disclosure.

FIG. 6 is a block diagram illustrating example blocks executed to implement one aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 600, a UE receives an indication from a serving base station. For example, UE 115, under control of controller/processor 280, receives a dynamic indication from a serving base station via antennas 252a-r and wireless radios 900a-r. In one aspect of the present disclosure, the dynamic indication of whether legacy SC-FDM or IFDM DMRS is used in the current uplink subframe may be determined by the serving base station based on SU/MU operation, subframe type (e.g., normal or UpPTS), RB assignment, or the like. The dynamic indication may be implemented using the downlink control indicator (DCI), either with a dedicated bit indicator in the DCI or based on a particular DCI format and search space (e.g., DCI format 0 in the common search space may be associated with legacy SC-FDM DMRS, while other formats in the UE-specific search space may be associated with IFDM DMRS configuration). Alternatively, the dynamic indicator may take the form of the resource block (RB) assignment, in which a DMRS configuration may be associated with the number of RBs assigned (e.g., odd vs. even RBs).

At block 601, the UE configures transmission of uplink DMRS according to a transmission configuration identified by the indication, wherein the indication identifies either an SC-FDM or IFDM configuration. For example, UE 115 uses the dynamic indication and selects the DMRS configuration from DMRS configurations 901, stored in memory 282. The indicator identifies which of the configurations, such as whether UE 115 will implement an SC-FDM configuration or an IFDM configuration for transmission of DMRS.

At block 602, the UE transmits the DMRS according to the transmission configuration. For example, UE 115, under control of controller/processor 280 executes DMRS generator 902 to generate a DMRS for transmission via wireless radios 900a-r and antennas 252a-r. Controller/processor 280 configures wireless radios 900a-r for transmitting the DMRS according to the scheduled transmission configuration.

Figure 7B:
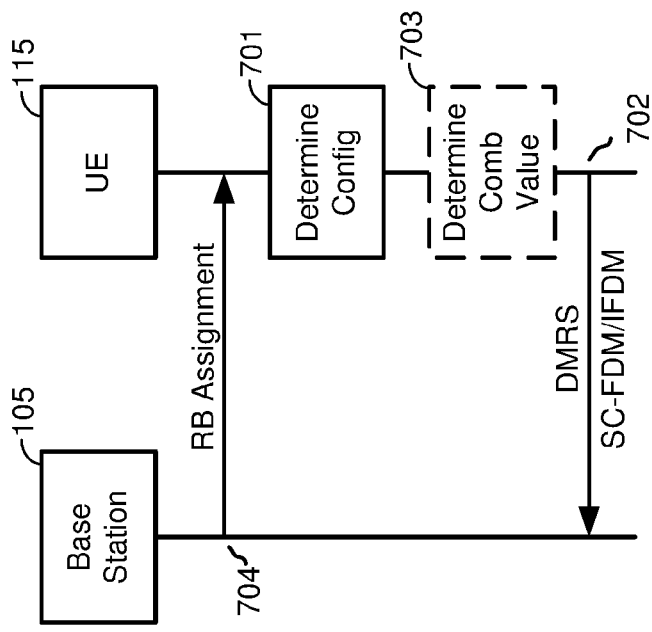
FIGS. 7A and 7B are call flow diagrams illustrating communication between a base station and UE configured according to one aspect of the present disclosure.
Figure 7A:
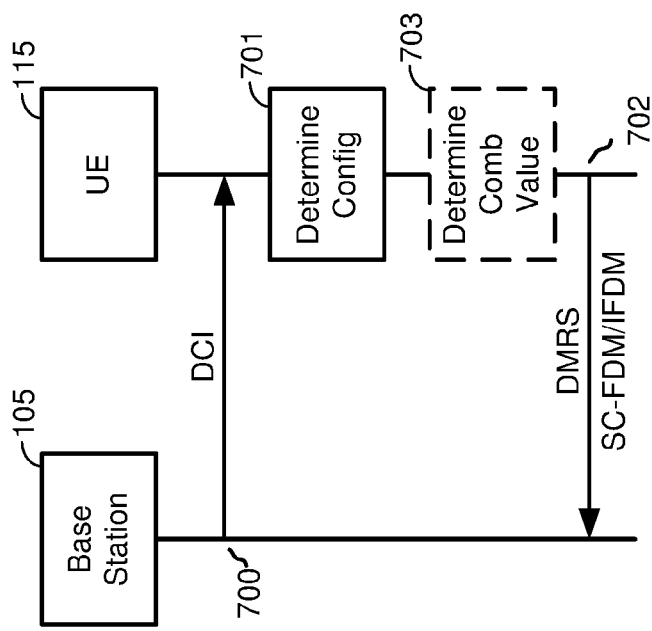

FIG. 7A is a call flow diagram illustrating communication between a base station 105 and UE 115 configured according to one aspect of the present disclosure. The dynamic indication received by UE 115 from base station 105 may be implemented using an additional bit in DCI transmission 700. The dynamic indication may include a dedicated bit or may be based on a particular DCI format and search space. For example, if DCI transmission 700 is a DCI format 0 and located in the common search space (CSS), it may be associated with legacy SC-FDM DMRS. Other DCI formats in the CSS or DCI format 0 in the UE-specific search space would be associated with use of IFDM DMRS. Thus, after receiving DCI transmission 700, UE 115 determines the DMRS configuration at 701. UE 115 transmits the DMRS at 702 based on the determined DMRS configuration.

FIG. 7B is a call flow diagram illustrating communication between a base station 105 and UE 115 configured according to another aspect of the present disclosure. In an alternative aspect, as illustrated in FIG. 7B, the indication may be a dynamic indication implicitly determined by RB assignment. Base station 105 transmits the RB assignment at 704 to UE 115. The particular transmission configuration for DMRS will be associated with the RB assignment. For example, if the number of assigned RBs is odd, the legacy SC-FDM DMRS may be considered, while an even number of assigned RBs may be considered for IFDM DMRS. Thus, after UE 115 receives the RB assignment, at 704, it determines the transmission configuration at 701 based on the indication. UE 115 may then transmit the DMRS at 702 based on the determined DMRS configuration.

When the IFDM DMRS configuration is indicated in the dynamic indication, the implemented comb value (e.g., 0 or 1 for comb=2 or 0, 1, 2 or 3 for comb=4) may be implicitly determined at 703 by the 3-bit OCC/CS indication field in the uplink DCI. In other words, the association of one or more OCC/CS combinations with a particular comb value may be fixed or semi-statically configured by RRC signaling. For example, when the IDFM configuration is indicated for DMRS, UE 115, under control of controller/processor 280, accesses the OCC/CS combination associations at comb value table 903, stored in memory 282, to identify the implemented comb value number. The information in comb value table 903 may be predetermined or may be semi-statically configured via RRC signaling. In one example implementation, for a comb=2, the OCC/CS field may correspond to "000", "001", "010", and "111" may be associated with the same comb value of 0 (the first subcarrier of every two subcarriers) and other OCC/CS values are associated with a comb value of 1 (the second subcarrier of every two subcarriers).

TABLE 1

| CS Field in UL DCI format | Comb values for comb = 2 | Comb values for comb = 4 | $n^{(2)}_{DMRS,\lambda}$ | | | | $[w^{(\lambda)}(0)\ w^{(\lambda)}(1)]$ | | | |
|---|---|---|---|---|---|---|---|---|---|---|
| | | | $\lambda=0$ | $\lambda=1$ | $\lambda=2$ | $\lambda=3$ | $\lambda=0$ | $\lambda=1$ | $\lambda=2$ | $\lambda=3$ |
| 000 | 0 | 0 | 0 | 6 | 3 | 9 | [1 1] | [1 1] | [1 −1] | [1 −1] |
| 001 | 0 | 0 | 6 | 0 | 9 | 3 | [1 −1] | [1 −1] | [1 1] | [1 1] |
| 010 | 0 | 1 | 3 | 9 | 6 | 0 | [1 −1] | [1 −1] | [1 1] | [1 1] |
| 011 | 1 | 2 | 4 | 10 | 7 | 1 | [1 1] | [1 1] | [1 1] | [1 1] |
| 100 | 1 | 3 | 2 | 8 | 5 | 11 | [1 1] | [1 1] | [1 1] | [1 1] |
| 101 | 1 | 3 | 8 | 2 | 11 | 5 | [1 −1] | [1 −1] | [1 −1] | [1 −1] |
| 110 | 1 | 2 | 10 | 4 | 1 | 7 | [1 −1] | [1 −1] | [1 −1] | [1 −1] |
| 111 | 0 | 1 | 9 | 3 | 0 | 6 | [1 1] | [1 1] | [1 −1] | [1 −1] |

FIG. 8A is a block diagram illustrating a special subframe 80 communicated between a UEs 115a and 115b and base station 105 configured according to one aspect of the present disclosure. When configured for IFDM DMRS, UE 115a may transmit DMRS multiplexed with UE 115b in the uplink pilot time slot (UpPTS) of special subframe 80. As illustrated, '1' identifies DMRS transmitted by UE 115a, while '2' identifies DMRS transmitted by UE 115b.

FIG. 8B is a block diagram illustrating special subframe 81 communicated between a UE 115 and base station 105 configured according to one aspect of the present disclosure. Additional aspects of the present disclosure, as illustrated in FIG. 8B, provide for use of IFDM DMRS in the UpPTS of special subframe 81 to support MU-MIMO and all for SRS to be multiplexed with the IFDM DMRS in same symbol, symbol 3 of the UpPTS. For interleaved DMRS ('R') and SRS ('S') to be multiplexed in the same symbol, the DMRS and SRS may either be from the same or different UEs. When from the same UE, as illustrated in FIG. 8B, DRMS and SRS transmitted from UE 115 may have a partially overlapped RB assignment. However, if the total transmission power of the transmission exceeds the maximum allowed transmission power, UE 115 may drop the SRS transmissions in the DMRS symbol, symbol 3 of the UpPTS.

FIG. 8C is a block diagram illustrating special subframe 82 communicated between UEs 115a and 115b and eNB 105 configured according to one aspect of the present disclosure. In an alternative aspect illustrated in FIG. 8C, the last symbol in the UpPTS of special subframe 82, symbol 6, may also be configured for DMRS in order to enable time domain OCC for increasing DMRS port orthogonality. Additionally, the two DMRS symbols in the UpPTS of special subframe 82 may have different types, (e.g., one with legacy SC-FDM and another with IFDM). For example, if the symbol is configured also for SRS transmission, then IFDM DMRS may be used, otherwise the legacy SC-FDM DMRS is used. Thus, as illustrated in FIG. 8C, symbol 3 would be configured with the legacy SC-FDM, while symbol 6, which is configured also for SRS transmission, would be configured for IFDM DMRS.

It should be noted that utilization of the SRS symbol for DMRS may also be applied for regular uplink subframes when DMRS is configured for IFDM.

Additional aspects of the present disclosure provide for the DMRS in IFDM configuration implementations to be decimated compared with PUSCH data (e.g., 6 tones RS vs. 12 tones data for comb number 2). Additional power boosting may also be applied to the DMRS in order to maintain the same total power across the reference signal and data symbols. For example, when generating a decimated DMRS for IFDM configured transmissions, UE 115, under control of controller/processor 280 (FIG. 9) executes power boosting logic 904. The execution environment of power boosting logic 904 applies a first power booster to DMRS symbols and a second power value to the PUSCH data tones. The application of the different power boosters operates to maintain the same total power across the transmissions. Assuming a beta_PUSCH as a power scaling parameter for the data symbols, the scaling parameter for DMRS symbols may be updated to sqrt(2)*beta_PUSCH for comb number=2 or sqrt(4)*beta_PUSCH for comb number=4. In contrast, current specifications provide for use of the same scaling parameter beta_PUSCH for both data symbols and DMRS symbols. If a mixed IFDM and SC-FDM DMRS is configured, the execution environment of power boosting logic 904 may provide for power scaling for DMRS to be different in each DMRS symbol.

In aspects directed to piggybacking uplink control information (UCI) onto PUSCH, a separate beta_offset management may be considered for different DMRS types. For example, when UCI piggybacking is implemented by UE 115 on PUSCH transmissions to the served base station, multiple beta_offsets may be stored at beta_offsets 905 in memory 282. Such beta_offsets are different from the regular power offset. The beta_offset represents an offset for computing how many REs will be used for the UCI that are piggybacked on PUSCH. The offset, selected from beta_offsets 905, can be configured for each UCI type (e.g, ACK/NAK vs. RI vs. CQI/PMI). For example, a legacy beta_offset selected by UE 115 from beta_offsets 905 can be used for legacy DM-RS, while a new beta_offset from beta_offsets 905 may be separately configured for IFDM DMRS of a comb value number of 2 or 4. A new beta_offset may be beneficial as the expected interference may be higher with usage of IFDM DMRS, which is associated with higher-order MU-MIMO. As a result, each PUSCH with IFDM DMRS may be subject to higher interference.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The present disclosure comprises a first aspect, such as a non-transitory computer-readable medium having program code recorded thereon, the program code comprising:

program code for causing a computer to receive, at a user equipment (UE), an indication from a serving base station;

program code for causing the computer to configure transmission of uplink demodulation reference signals (DMRS) according to a transmission configuration identified by the indication, wherein the indication identifies one of: a single carrier frequency divisional multiplex (SC-FDM) or interlaced frequency divisional multiplex (IFDM) configurations; and program code for causing the computer to transmit the DMRS according to the transmission configuration.

Based on the first aspect, the non-transitory computer-readable medium of a second aspect, wherein the program code for causing the computer to receive the indication includes one of:

program code for causing the computer to receive a downlink control information (DCI) from the serving base station, wherein the indication is associated with a bit indicator included in the DCI indicating one of: the SC-FDM or IFDM configurations; or program code for causing the computer to receive the DCI from the serving base station in a search space, wherein the one of: the SC-FDM or IFDM configurations is determined based on a format of the DCI and a type of the search space.

Based on the first aspect, the non-transitory computer-readable medium of a third aspect, wherein the program code for causing the computer to receive the indication includes:

program code for causing the computer to receive a resource block assignment from the serving base station, wherein the one of: the SC-FDM or IFDM configurations is determined based on whether the resource block assignment assigns an even number of resource blocks or an odd number of resource blocks.

Based on the first aspect, the non-transitory computer-readable medium of a fourth aspect, further including, executing, in response to the indication identifying the IFDM configuration:

program code for causing the computer to identify a field value of an orthogonal cover code (OCC)/cyclic shift (CS) field in an uplink DCI received from the serving base station; and program code for causing the computer to determine a comb value for the program code for causing the computer to transmit the DMRS associated with the identified field value, wherein the program code for causing the computer to transmit the DMRS is executed using the determined comb value.

Based on the fourth aspect, the non-transitory computer-readable medium of a fifth aspect, wherein the association of the comb value to field value is one of:

predetermined at the UE;

received by the UE from a configuration message.

Based on the fifth aspect, the non-transitory computer-readable medium of another aspect, wherein the field value of one of: "000", "001," "010", and "111" correspond to the comb value of 0, and wherein the field value of another value correspond to the comb value of 1.

Based on the first aspect, the non-transitory computer-readable medium of a sixth aspect, further including:

program code for causing the computer to identify one or more symbols within a subframe for the program code for causing the computer to transmit according to the transmission configuration;

program code for causing the computer to interleave transmission of the DMRS with sounding reference signals (SRS) scheduled for at least one of the one or more symbols.

Based on the sixth aspect, the non-transitory computer-readable medium of a seventh aspect, further including:

program code for causing the computer to configure a last symbol of the subframe for program code for causing the computer to transmit, wherein the transmission of the DMRS on the last symbol is different than the one or more symbols;

program code for causing the computer to apply a first configuration to DMRS transmissions for at least one of the one or more symbols; and program code for causing the computer to apply a second configuration different than the first configuration to DMRS transmissions for the last symbol of the subframe.

Based on the sixth aspect, the non-transitory computer-readable medium of an eighth aspect, wherein the DMRS and the SRS are scheduled for the UE, and wherein the DMRS and the SRS have partially overlapped RB assignment for the UE.

Based on the eighth aspect, the non-transitory computer-readable medium of a ninth aspect, further including:

program code for causing the computer to determine a total power for transmission of the DMRS and the SRS;

program code for causing the computer to drop the transmission of the SRS when the determined total power exceeds a maximum allowed transmission power for the UE.

Based on the sixth aspect, the non-transitory computer-readable medium of a tenth aspect, wherein the subframe includes one of: a regular subframe, or a special subframe.

Based on the first aspect, the non-transitory computer-readable medium of an eleventh aspect, further including, in response to the indication identifying the IFDM configuration:

applying a power boosting to the DMRS, wherein the power boosting maintains a same total power across DMRS transmissions and data transmissions, wherein the power boosting is scaled based on the configured number of comb values.

Based on the eleventh aspect, the non-transitory computer-readable medium of a twelfth aspect, wherein the power boosting applied to the DMRS transmissions is different than a power boost applied to the data transmissions.

Based on the twelfth aspect, the non-transitory computer-readable medium of a thirteenth aspect, wherein the transmission configuration for additional symbols in the subframe are determined to be SC-FDM, the program code further including:

program code for causing the computer to apply a different power boosting to a different DMRS transmission scheduled for SC-FDM in the additional symbols.

Based on the first aspect, the non-transitory computer-readable medium of a fourteenth aspect, further including:

program code for causing the computer to configure transmitting uplink control information (UCI) onto a uplink shared channel;

program code for causing the computer to apply a first beta_offset for UCI configured for PUSCH transmission according to UCI type and configured for a first transmission configuration; and program code for causing the computer to apply a second beta_offset for UCI configured for PUSCH transmission according to a second transmission configuration.

A fifteenth aspect of the non-transitory computer-readable medium of any combination of the first through fourteenth aspects.

The present disclosure comprises a sixteenth aspect, such as an apparatus configured for wireless communication, the apparatus comprising:

at least one processor; and a memory coupled to the at least one processor, wherein the at least one processor is configured:

to receive, at a user equipment (UE), an indication from a serving base station;

to configure transmission of uplink demodulation reference signals (DMRS) according to a transmission configuration identified by the indication, wherein the indication identifies one of: a single carrier frequency divisional multiplex (SC-FDM) or interlaced frequency divisional multiplex (IFDM) configurations; and to transmit the DMRS according to the transmission configuration.

Based on the sixteenth aspect, the apparatus of a seventeenth aspect, wherein the configuration of the at least one processor to receive the indication includes configuration to one of:

receive a downlink control information (DCI) from the serving base station, wherein the indication is associated with a bit indicator included in the DCI indicating one of: the SC-FDM or IFDM configurations; or receive the DCI from the serving base station in a search space, wherein the one of: the SC-FDM or IFDM configurations is determined based on a format of the DCI and a type of the search space.

Based on the sixteenth aspect, the apparatus of an eighteenth aspect, wherein the configuration of the at least one processor to receive the indication includes configuration to receive a resource block assignment from the serving base station, wherein the one of: the SC-FDM or IFDM configurations is determined based on whether the resource block assignment assigns an even number of resource blocks or an odd number of resource blocks.

Based on the sixteenth aspect, the apparatus of a nineteenth aspect, further including, configuration of the at least one processor, in response to the indication identifying the IFDM configuration:

to identify a field value of an orthogonal cover code (OCC)/cyclic shift (CS) field in an uplink DCI received from the serving base station; and to determine a comb value for the transmission of the DMRS associated with the identified field value, wherein the configuration to transmit the DMRS is performed using the determined comb value.

Based on the nineteenth aspect, the apparatus of a twentieth aspect, wherein the association of the comb value to field value is one of:

predetermined at the UE;
received by the UE from a configuration message.

Based on the twentieth aspect, the apparatus of another aspect, wherein the field value of one of: "000", "001," "010", and "111" correspond to the comb value of 0, and wherein the field value of another value correspond to the comb value of 1.

Based on the sixteenth aspect, the apparatus of a twenty-first aspect, further including configuration of the at least one processor:

to identify one or more symbols within a subframe for transmission according to the transmission configuration;

to interleave transmission of the DMRS with sounding reference signals (SRS) scheduled for at least one of the one or more symbols.

Based on the twenty-first aspect, the apparatus of a twenty-second aspect, further including configuration of the at least one processor:

to configure a last symbol of the subframe for the configuration to transmit, wherein the transmission of the DMRS on the last symbol is different than the one or more symbols;

to apply a first configuration to DMRS transmissions for at least one of the one or more symbols; and to apply a second configuration different than the first configuration to DMRS transmissions for the last symbol of the subframe.

Based on the twenty-first aspect, the apparatus of a twenty-third aspect, wherein the DMRS and the SRS are scheduled for the UE, and wherein the DMRS and the SRS have partially overlapped RB assignment for the UE.

Based on the twenty-third aspect, the apparatus of a twenty-fourth aspect, further including configuration of the at least one processor:

to determine a total power for transmission of the DMRS and the SRS;

to drop the transmission of the SRS when the determined total power exceeds a maximum allowed transmission power for the UE.

Based on the twenty-first aspect, the apparatus of a twenty-fifth aspect, wherein the subframe includes one of: a regular subframe, or a special subframe.

Based on the sixteenth aspect, the apparatus of a twenty-sixth aspect, wherein the transmission configuration is determined to be IFDM, the apparatus further including configuration of the at least one processor:

to determine a comb value number for transmission of the DMRS;

to apply a power boosting to the DMRS, wherein the power boosting maintains a same total power across DMRS transmissions and data transmissions, wherein the power boosting is scaled based on the comb value number.

Based on the twenty-sixth aspect, the apparatus of a twenty-seventh aspect, wherein the power boosting applied to the DMRS transmissions is different than a power boost applied to the data transmissions.

Based on the twenty-seventh aspect, the apparatus of a twenty-eighth aspect, wherein the transmission configuration for additional symbols in the subframe are determined to be SC-FDM, the apparatus further including configuration of the at least one processor to apply a different power boosting to a different DMRS transmission scheduled for SC-FDM in the additional symbols.

Based on the sixteenth aspect, the apparatus of a twenty-ninth aspect, further including configuration of the at least one processor:

to configure transmitting uplink control information (UCI) onto a uplink shared channel;

to apply a first beta_offset for UCI configured for PUSCH transmission according to UCI type and configured for a first transmission configuration; and to apply a second beta_offset for UCI configured for PUSCH transmission according to a second transmission configuration.

A thirtieth aspect of the apparatus of any combination of the sixteenth through twenty-ninth aspects.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, at a user equipment (UE), an indication from a serving base station, wherein the receiving the indication includes receiving a resource block assignment from the serving base station;
   configuring transmission of at least a portion of uplink demodulation reference signals (DMRS) according to a transmission configuration identified by the indication, wherein the indication identifies single carrier frequency divisional multiplex (SC-FDM) for the transmission configuration when a number of resource blocks assigned by the resource block assignment is a first number, and interlaced frequency divisional multiplex (IFDM) for the transmission configuration when the number of resource blocks assigned by the resource block assignment is a second number different from the first number; and
   transmitting the DMRS according to the transmission configuration.

2. The method of claim 1, wherein the second number is an even number of resource blocks and the first number is an odd number of resource blocks.

3. The method of claim 1, further including, in response to the indication identifying the IFDM configuration:
   identifying a field value of an orthogonal cover code (OCC)/cyclic shift (CS) field in an uplink DCI received from the serving base station; and
   determining a comb value for the transmitting the DMRS associated with the identified field value, wherein the transmitting the DMRS is performed using the determined comb value.

4. The method of claim 3, wherein the association of the comb value to field value is one of:
   predetermined at the UE;
   received by the UE from a configuration message.

5. The method of claim 4,
   wherein the field value of one of: "000", "001," "010", and "111" correspond to the comb value of 0, and
   wherein the field value of another value correspond to the comb value of 1.

6. The method of claim 1, further including:
   identifying one or more symbols within a subframe for the transmitting according to the transmission configuration;
   interleaving transmission of the DMRS with sounding reference signals (SRS) scheduled for at least one of the one or more symbols.

7. The method of claim 6, further including:
   configuring a last symbol of the subframe for the transmitting, wherein the transmission of the DMRS on the last symbol is different than the one or more symbols;
   applying a first configuration to DMRS transmissions for at least one of the one or more symbols; and
   applying a second configuration different than the first configuration to transmissions for the last symbol of the subframe.

8. The method of claim 6, wherein the DMRS and the SRS are scheduled for the UE, and wherein the DMRS and the SRS have partially overlapped RB assignment for the UE.

9. The method of claim 8, further including:
   determining a total power for transmission of the DMRS and the SRS;

dropping the transmission of the SRS when the determined total power exceeds a maximum allowed transmission power for the UE.

10. The method of claim 6, wherein the subframe includes one of: a regular subframe, or a special subframe.

11. The method of claim 1, further including, in response to the indication identifying the IFDM configuration:
applying a power boosting to the DMRS, wherein the power boosting maintains a same total power across DMRS transmissions and data transmissions, wherein the power boosting is scaled based on the configured number of comb values.

12. The method of claim 11, wherein the power boosting applied to the DMRS transmissions is different than a power boost applied to the data transmissions.

13. The method of claim 12, wherein the power boosting applied to the DMRS transmissions is different than a different power boosting applied to a different DMRS transmission scheduled for SC-FDM in additional symbols.

14. The method of claim 1, further including:
configuring transmitting uplink control information (UCI) onto a uplink shared channel;
applying a first beta_offset for UCI configured for PUSCH transmission according to UCI type and configured for a first transmission configuration possible for the transmission configuration; and
applying a second beta_offset for UCI configured for PUSCH transmission according to a second transmission configuration possible for the transmission configuration.

15. An apparatus configured for wireless communication, comprising:
means for receiving, at a user equipment (UE), an indication from a serving base station, wherein the receiving the indication includes receiving a resource block assignment from the serving base station;
means for configuring transmission of at least a portion of uplink demodulation reference signals (DMRS) according to a transmission configuration identified by the indication, wherein the indication identifies single carrier frequency divisional multiplex (SC-FDM) for the transmission configuration when a number of resource blocks assigned by the resource block assignment is a first number, and interlaced frequency divisional multiplex (IFDM) for the transmission configuration when the number of resource blocks assigned by the resource block assignment is a second number different from the first number; and
means for transmitting the DMRS according to the transmission configuration.

16. The apparatus of claim 15, wherein the second number is an even number of resource blocks and the first number is an odd number of resource blocks.

17. The apparatus of claim 15, further including, in response to the indication identifying the IFDM configuration:
means for identifying a field value of an orthogonal cover code (OCC)/cyclic shift (CS) field in an uplink DCI received from the serving base station; and
means for determining a comb value for the means for transmitting the DMRS associated with the identified field value, wherein the means for transmitting the DMRS is performed using the determined comb value.

18. The apparatus of claim 17, wherein the association of the comb value to field value is one of:
predetermined at the UE;
received by the UE from a configuration message.

19. The apparatus of claim 15, further including:
means for identifying one or more symbols within a subframe for the means for transmitting according to the transmission configuration;
means for interleaving transmission of the DMRS with sounding reference signals (SRS) scheduled for at least one of the one or more symbols.

20. The apparatus of claim 19, further including:
means for configuring a last symbol of the subframe for means for the transmitting, wherein the transmission of the DMRS on the last symbol is different than the one or more symbols;
means for applying a first configuration to DMRS transmissions for at least one of the one or more symbols; and
means for applying a second configuration different than the first configuration to transmissions for the last symbol of the subframe.

21. The apparatus of claim 19, wherein the DMRS and the SRS are scheduled for the UE, and wherein the DMRS and the SRS have partially overlapped RB assignment for the UE.

22. The apparatus of claim 21, further including:
means for determining a total power for transmission of the DMRS and the SRS;
means for dropping the transmission of the SRS when the determined total power exceeds a maximum allowed transmission power for the UE.

23. The apparatus of claim 19, wherein the subframe includes one of: a regular subframe, or a special subframe.

24. The apparatus of claim 15, further including:
means for applying a power boosting to the DMRS in response to the indication identifying the IFDM configuration, wherein the power boosting maintains a same total power across DMRS transmissions and data transmissions, wherein the power boosting is scaled based on the configured number of comb values.

25. The apparatus of claim 24, wherein the power boosting applied to the DMRS transmissions is different than a power boost applied to the data transmissions.

26. The apparatus of claim 25, wherein the power boosting applied to the DMRS transmissions is different than a different power boosting to a different DMRS transmission scheduled for SC-FDM in the additional symbols.

27. The apparatus of claim 15, further including:
means for configuring transmitting uplink control information (UCI) onto a uplink shared channel;
means for applying a first beta_offset for UCI configured for PUSCH transmission according to UCI type and configured for a first transmission configuration possible for the transmission configuration; and
means for applying a second beta_offset for UCI configured for PUSCH transmission according to a second transmission configuration possible for the transmission configuration.

* * * * *